Figure 1:
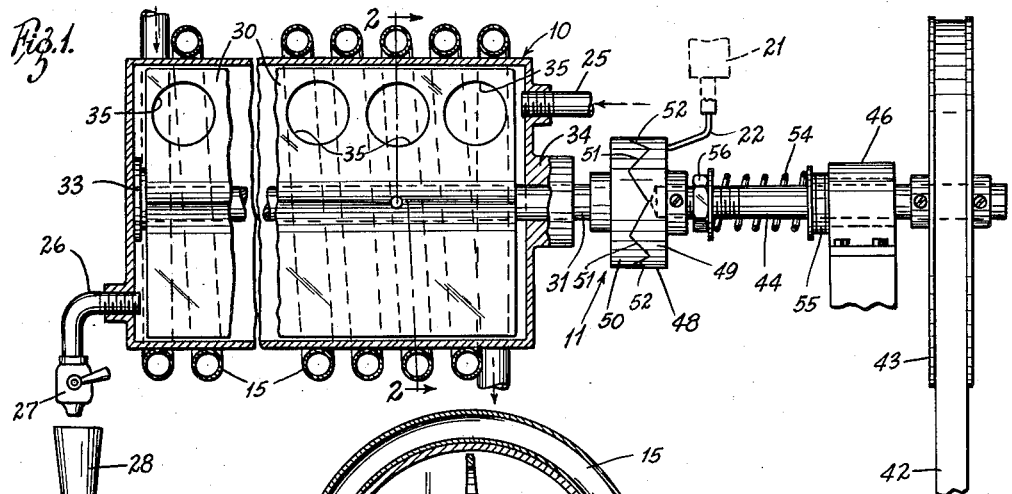

Oct. 29, 1963  
C. M. LENTS  
3,108,449  
MACHINE FOR MAKING AN ICY PRODUCT WITH  
TORQUE SENSITIVE CONTROL  
Filed March 3, 1961

INVENTOR:  
CHARLES M. LENTS  
BY Kingsland, Rogers & Ezell  
ATTORNEYS

United States Patent Office 3,108,449
Patented Oct. 29, 1963

3,108,449
MACHINE FOR MAKING AN ICY PRODUCT WITH TORQUE SENSITIVE CONTROL
Charles M. Lents, Dallas, Tex., assignor to John E. Mitchell Company, Dallas, Tex., a corporation of Missouri
Filed Mar. 3, 1961, Ser. No. 93,248
7 Claims. (Cl. 62—70)

The present invention relates to an icy product machine with a torque-sensitive control. This machine is of the type disclosed in co-pending application Serial No. 749,-392, filed by Omar Knedlik on July 18, 1958, now Patent No. 3,044,878, issued July 17, 1962.

In this machine there is a refrigerating container into which are disposed a base liquid (usually water), flavor, and pressurizing gas (usually carbonic acid). Typically the composition in the container may be a cola syrup and carbonated water, although other liquids of like character can be treated. The refrigerating means is designed to reduce the temperature of the fluent composition within the container to a few degrees below its freezing point at outside pressures; but, because of the pressure in the container caused by the carbonating gas, the temperature is not low enough to produce the rapid freezing therein. Agitation is provided within the receptacle to keep the liquid in motion, to distribute the incipiently-forming ice throughout the mass, and to prevent the build-up of ice on the walls of the container. The agitating means preferably comprises a stirring device that extends from a center axis of the container substantially to the inner walls thereof. A discharge valve or faucet is connected to the container and is designed to provide discharge of the drink or like product into a vat or other receptacle. When the fluent composition is released to atmospheric pressure, the carbonating gas escapes and causes formation of a multitude of tiny, discrete and unagglomerated ice particles evenly distributed in the product. The ratio of ice to liquid can be adjusted by regulating the temperature and pressure conditions within the receptacle.

In the Knedlik application aforesaid, the conditions of the fluent material within the container are controlled by a thermostat, which was described as being set to minimize formation of ice in the container. It has been determined, however, that thermostatic control is relatively inaccurate and may permit the buildup of an excessive amount of ice within the container. While a small amount of ice within the container is permissible, nevertheless the development of an excessive amount not only insulates the walls of the container, but also interferes with the free-flow of the material from the container when the faucet is opened.

In the present invention, the process involves actually producing what is called an incipient freezing within the container, and the regulation of the amount of such freezing to hold it to a certain maximum. The arrangement also comprises regulating the production of refrigeration as a function of the actual freezing produced, this being obtained by sensing the incipient accumulation of ice, as a function of viscosity of the material.

In the present invention the agitating means consists of a stirring blade within the container that is rotated by some means such as a drive through a belt and a pulley. The driving shaft is connected to the shaft of the rotating agitator through a coupling that is torque responsive so that it will produce a displacement of an element when the torque transmitted reaches a predetermined high value. The displaceable element operates a switch to control the refrigerating means to regulate circulation of refrigerant through the coils around the container.

Thus, the fluent material within the container, which can be called liquid, although it may contain some ice, is maintained as a function of the viscosity within the container. The viscosity in turn is the function of the amount of freezing of the liquid and hence is a function of the temperature of the liquid. However, it is not subject to the disadvantages of direct temperature control through a thermostat disposed within the container.

The objects of the invention include the provision of a control system for drinks or the like made in accordance with the present equipment, which control system operates as a function of the viscosity of the liquid within the container and is independent of temperature pockets that could otherwise influence a direct temperature-responsive sensing element. Other objects will appear from the description to follow.

Figure 2:
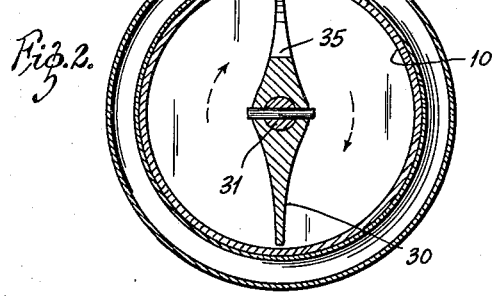
Figure 3:
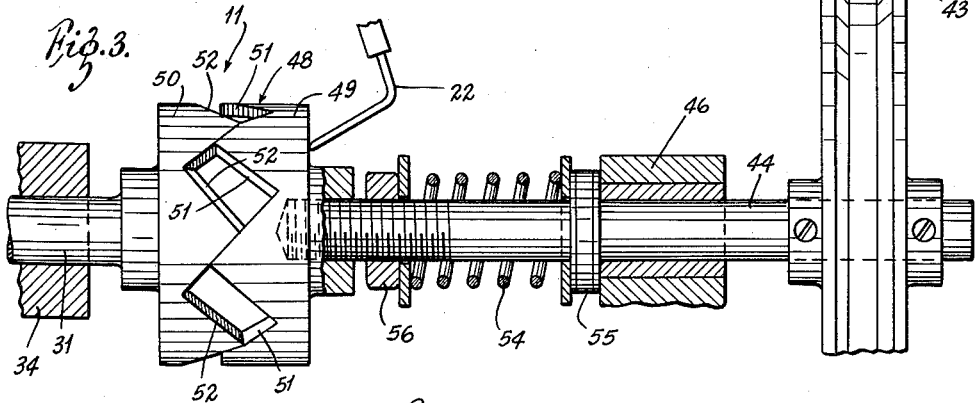
Figure 4:
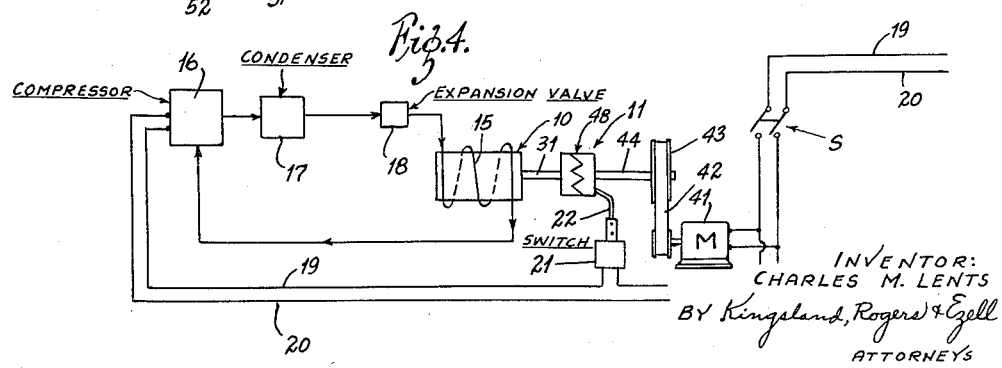

In the drawing:
FIGURE 1 is a somewhat diagrammatic cross section through the container showing the control;
FIGURE 2 is a cross section through the container on the line 2—2 of FIGURE 1;
FIGURE 3 is an enlarged view through the actuating element of the control, the view being partly in section; and
FIGURE 4 is a schematic view of the system.

The principal components of the present invention include the refrigerated container 10 and the control generally indicated at 11. The entire system, including the refrigeration mechanism as well as the components 10 and 11, is shown diagrammatically in FIGURE 4. In FIGURE 4 the refrigeration circuit comprises a compressor 16, directing refrigerant to a condenser 17, thence through an expansion valve 18 from which it goes into the coil 15 and therefrom returns to the compressor. The refinements of the system are not illustrated since they form no part of the present invention.

The compressor is illustrated as electrically operated. The power wires 19 and 20 leading to the compressor 16 are under control of a switch 21 having an actuating arm 22 that is operated by the control 11 as will appear.

Referring to FIGURES 1 and 3, in order to explain details of the invention, the container 10, illustrated as circular, has an inlet 25, here shown at its upper right, and it has an outlet 26 that can lead to a spigot or the like discharge valve 27. A drinking glass 28 is illustrated in diagrammatic fashion beneath the faucet 27.

The refrigeration of the container is produced through the evaporator coils 15 that are diagrammatically shown as wrapped around the outside of the container 10. It is understood that any suitable means may be employed for combining the evaporator and the container so that the walls of the container are cooled.

Within the container 10 there is an agitator paddle or blade 30, mounted on a shaft 31 extending along the axis of the container 10. The axle 31 can be supported in appropriate bearings 33 and 34 at opposite ends of the container. Anti-friction means are not illustrated since they can be conventional. The blades may or may not have holes 35 through it, as it functions either with or without them. Other shapes may be given to the element that is moved through the material in the container. The agitator blade 30 should extend almost to the inside surface of the walls of the container 10. It has been found that the best results are obtained where there is a clearance of about $\frac{1}{32}$ of an inch between the blade and the surface although this is subject to variation.

The axle 31 and the agitator 30 are rotated through from a power source such as an electric motor 41 that drives a belt 42 and a pulley 43. The pulley in turn rotates a shaft 44 that is rotatably and slidably supported in in a pillow block 46. The other end of the shaft 44 is secured in one half of a coupling 48. This coupling has two relatively movable complementary, cammed elements, 49 and 50. The element 49 is secured to the shaft 44, and the element 50 is secured to the axle shaft 31. The coupling elements have camming interfaces 51, 52 that cause axial movement upon relative angular displacement between them. As illustrated, the camming surfaces 51, 52 are toothed so as to effect axial movement upon angular displacement in either direction.

The coupling elements 49 and 50 are yieldably urged together by a coil spring 54 surrounding the shaft 44. It is confined between a washer bearing on a thrust bearing 55 at its right end, and a washer bearing on a nut 56 threaded onto the shaft at the other end. Adjustment of the nut 56 regulates the force of the spring 54. The nut may be fixed by a set screw.

As noted, the compressor 16 is controlled by the switch 21. The switch actuating lever 22 is adapted to abut the coupling member 49 so that it can be rocked in a manner to open and close the switch 21, thereby causing the compressor to be energized or to be de-energized in response to axial movement of the coupling element 49.

Operation and Process

At the start, appropriate amounts of syrup and carbonated water are separately or jointly introduced into the container 10 through the inlet 25. A typical operation comprises the introduction of cola drink syrup and carbonated water into the container. The carbonation should be sufficient to raise the pressure within the container to about 15 p.s.i. at 28° F.

When a master switch S is closed in the power lines 19 and 20, the motor 41 starts. This drives the belt 42 and the pulley 43 to turn the shaft 44. At this time, since the materials in the container 10 are warm and liquid, there is little resistance to the turning of the agitator paddle 30, so that the coupling 40 remains closed and transmits the torque of the driving shaft 44 to the driven shaft 31, causing the agitator 30 to rotate.

With the coupling closed, the switch arm 22 is in switch-closing position so that the compressor is energized and the refrigeration system is made operative. This causes the refrigerant to flow through the expansion coils 15 and to cool the contents of the container 10.

The cooling proceeds until the liquid within the container begins to freeze and to become more viscous as a result thereof. The turning of the agitator promotes intimate contact between the water and the carbon dioxide, causing the water to be uniformly permeated with the gas. The result is to lower the freezing point of the product. This is one of the factors that allows the product to be below freezing and still remain fluid. Another purpose of the agitator is to produce sufficient movement of the liquid within the container 10 to distribute the incipiently freezing material and to minimize the accumulation of ice on the inner walls. Also the proximity of the agitator blade to the inner walls causes it to remove any ice that does form thereon. Thus the liquid contents of the container are chilled, and, as freezing begins, the freezing material is sufficiently distributed to prevent the accumulation of ice on the inner walls and at the same time to produce a general increase in viscosity of the liquid.

When the viscosity increases, the torque transmitted through the coupling increases. As the resistance of the left hand coupling element 50 increases, the coupling element 49 finally overcomes the resistance of the spring 54 and slips with respect to the coupling element 50. The camming surfaces 51, 52 cause displacement of the coupling element 49 to the right, compressing the spring. When the viscosity of the liquid attains a predetermined value, determined by the compression resistance of the spring 54 set by the adjusting nut 56, the coupling element 49 is axially displaced far enough to the left to cause the switch arm 22 to open the switch 21 and to de-energize the compressor 16. This stops the refrigeration, and prevents further freezing of the material, thus limiting the freezing thereof to a so-called incipient character.

Thereafter, when, by intake of heat into the container 10, the material again becomes less viscous, the resistance to turning of the agitator blade 30 becomes less, the coupling 48 recloses, the switch 21 closes, and the refrigeration is restarted.

The system has been described as an on-off arrangement. A differential between the on and off points is provided. Also a modulating arrangement could be used. In any event, the system and process produce a drink or the like consisting of tiny ice particles, separate from one another rather than agglomerated, and do so as a function of the incipient freezing of the material under pressure above atmosphere and temperature slightly below freezing at the atmospheric pressure.

Various changes and modifications may be made within the process of this invention as will be readily apparent to those skilled in the art. Such changes and modifications are within the scope and teaching of this invention as defined by the claims appended hereto.

What is claimed is:

1. A method of making a slushy product, including the steps of confining a fluent and freezable liquid product under superatmospheric pressure of a gas contained therein: chilling it until it begins to freeze, restricting the chilling when the mass is a few degrees below its freezing point at atmospheric pressure, but is only incipiently frozen at the elevated pressure in the container, and its viscosity increases to a predetermined value, maintaining the chilling thus restricted until the viscosity is subsequently reduced to a predetermined value, then again increasing it, thereby producing and maintaining a product that is incipiently freezing but fluent at the pressure and temperature in the container; opening an outlet from the container, causing discharge of the product by pressure of the gas within the container and delivery of the product into a receptacle at atmospheric pressure, and thereby causing freezing of tiny discrete particles from the product after it is discharged from the container.

2. The method of claim 1, wherein the product comprises a flavored carbonated liquid, and the temperature in the container is maintained at about 28° F.

3. The method of claim 1, including sensing the viscosity in the container by detecting the resistance of the liquid to the movement of a member through the product and regulating the operation of a refrigerating means as a function of the resistance so detected.

4. The method of claim 1, including moving the product in the container so that the frozen particles thereof are distributed through the mass.

5. The method of claim 1, including restricting the chilling by regulating the distribution of a refrigerating fluid to the container.

6. In a combination for producing a slush-like product; a container; means for introducing liquid and gas into the container to provide a gas-charged flavored liquid at superatmospheric pressure; an evaporator for cooling the contents of the container, an electric motor-driven compressor for supplying refrigerant to the evaporator, a switch for controlling energization and de-energization of the compressor; a rotator in the container, a coupling for connecting the rotator to a power source, the coupling having a driving and a driven element and means yieldably urging them to rotate together but permitting lost motion between them upon existence of predetermined resistance to rotation of the rotator, caused by incipient freezing of the liquid; and switch-operating means for the compressor switch displaced by such lost motion to open the switch and stop the compressor when the resistance to rotation of the rotator reaches a predetermined amount, the switch operating means being returned upon subsequent reduction in said resistance, to restart the compressor; and conduit means to conduct the liquid from the container at superatmospheric pressure to the atmosphere to be received in a receptacle wherein the liquid is caused to freeze in tiny particles to form a slush, the conduit means containing a cut-off valve operable to open and closed positions, and the conducting means opening from the container below the liquid level therein, whereby gas pressure in the container urges liquid through the conduit means when the cut-off valve is opened.

7. In a system for producing a fluent chilled product of the kind described, the viscosity of which increases with decrease in temperature that causes incipient freezing of the product; a container to receive the product to be chilled; means to introduce liquid and gas into the container to provide a gas-charged fluid product therein at superatmospheric pressure; refrigerating means for the container; viscosity sensing means in the container; control means operated by the sensing means, and means connecting the control means with the refrigerating means to cause the latter to decrease refrigeration upon increase in viscosity of the gas-charged product being chilled above a predetermined degree, and to cause the refrigerating means again to increase said refrigeration upon subsequent decrease in the said viscosity, the viscosity sensing means comprising a rotator in the container, means to rotate the rotator in the product so that the resistance to rotation is a measure of the degree of freezing of the product; a resistingly yieldable coupling interposed in the rotating means, having a driven element connected to the rotator, a driving element adapted to be connected to a power source, yieldable means operating upon the elements to yieldably cause them to rotate together, but yieldable to permit relative movement between them when the resistance to rotation of the rotator reaches a predetermined amount; and wherein there is means in the control means operated by the relative movement of the elements; conduit means below the liquid level in the container to conduct the product from the container to a receptacle at atmospheric pressure, wherein the gas is released and the product freezes in tiny particles, and pressure-tight valve means in the conduit means to retain the fluid in the container at superatmospheric pressure or to release it to atmosphere as aforesaid, under the force of the pressure difference within and without the container.

References Cited in the file of this patent
UNITED STATES PATENTS

| | | |
|---|---|---|
| 1,763,567 | Simmons | June 10, 1930 |
| 1,998,841 | Modlin | Apr. 23, 1935 |
| 2,131,510 | Gray | Sept. 27, 1938 |
| 2,134,787 | Hartman | Nov. 1, 1938 |
| 2,150,792 | Willat | Mar. 14, 1939 |
| 2,272,614 | Reinken | Feb. 10, 1942 |
| 2,358,756 | Zoller | Sept. 19, 1944 |
| 2,536,319 | Slack | Jan. 2, 1951 |
| 2,541,814 | Gaddini | Feb. 13, 1951 |
| 2,779,515 | Welty | Jan. 29, 1957 |
| 2,793,505 | Finch | May 28, 1957 |
| 3,004,398 | Mullins | Oct. 17, 1961 |